(12) United States Patent
Ando et al.

(10) Patent No.: US 8,167,757 B2
(45) Date of Patent: May 1, 2012

(54) LIMITED SLIP DIFFERENTIAL AND MANUFACTURING METHOD FOR LIMITED SLIP DIFFERENTIAL

(75) Inventors: Junji Ando, Kariya (JP); Naoyuki Sakai, Anjo (JP); Hideyuki Saito, Kariya (JP); Yozo Yamashita, Higashimatsuyama (JP)

(73) Assignee: JTEKT Corporation, Osaka-shi (JP)

( * ) Notice: Subject to any disclaimer, the term of this patent is extended or adjusted under 35 U.S.C. 154(b) by 1051 days.

(21) Appl. No.: 12/103,375

(22) Filed: Apr. 15, 2008

(65) Prior Publication Data

US 2008/0261742 A1    Oct. 23, 2008

(30) Foreign Application Priority Data

Apr. 17, 2007  (JP) .................................. 2007-108062

(51) Int. Cl.
*F16H 57/04* (2010.01)
(52) U.S. Cl. ...................................................... 475/160
(58) Field of Classification Search .................. 475/160, 475/344
See application file for complete search history.

(56) References Cited

U.S. PATENT DOCUMENTS

| | | | |
|---|---|---|---|
| 1,389,720 A * | 9/1921 | Ward ............................... | 74/464 |
| 5,295,923 A * | 3/1994 | Takefuta ........................ | 475/252 |
| 5,507,703 A * | 4/1996 | Madsack et al. ............... | 475/248 |
| 5,556,351 A * | 9/1996 | Hiraishi et al. ................ | 475/160 |
| 6,080,076 A * | 6/2000 | Kwoka et al. .................. | 475/160 |
| 6,139,462 A | 10/2000 | Gage et al. | |
| 2004/0214683 A1* | 10/2004 | Yoshiyama et al. ........... | 475/344 |
| 2005/0014597 A1* | 1/2005 | Michaud et al. ............... | 475/344 |

FOREIGN PATENT DOCUMENTS

| | | |
|---|---|---|
| DE | 199 40 788 A1 | 3/2000 |
| EP | 0 622 569 A1 | 11/1994 |
| EP | 1 473 489 A1 | 11/2004 |
| JP | 5-280596 | 10/1993 |
| JP | 7-71562 | 3/1995 |
| JP | 7-332466 | 12/1995 |
| JP | 8-178017 | 7/1996 |
| JP | 10-153249 | 6/1998 |
| JP | 2002-178091 | 6/2002 |
| JP | 2004-324736 | 11/2004 |
| JP | 2006-46642 | 2/2006 |

OTHER PUBLICATIONS

Partial Search Report issued Mar. 16, 2011, in European Patent Application No. 08154599.8-2421 / 1983223.

* cited by examiner

*Primary Examiner* — David D Le
*Assistant Examiner* — David J Hlavka
(74) *Attorney, Agent, or Firm* — Oblon, Spivak, McClelland, Maier & Neustadt, L.L.P.

(57) ABSTRACT

A plurality of microscopic grooves are created on the surface of the teeth of planetary gears, and thus, irregular unevenness is created. This irregular unevenness includes a plurality of first microscopic grooves which function as lubricant grooves and a plurality of second microscopic grooves which are shallower than the first microscopic grooves.

3 Claims, 9 Drawing Sheets

Maximum Value (μm) of Power of Pitch of 40 μm to 60 μm

LIMITED SLIP DIFFERENTIAL AND MANUFACTURING METHOD FOR LIMITED SLIP DIFFERENTIAL

This application is based on and claims priority from Japanese Patent Application No. 2007-108062 filed on Apr. 17, 2007, the entire contents of which are incorporated herein by reference.

BACKGROUND OF THE INVENTION

The present invention relates to a limited slip differential and a manufacturing method for a limited slip differential.

Conventional limited slip differentials for vehicles include torque sensing limited slip differentials for limiting a differential motion in response to torque reaction force generated in a driving system. A typical torque sensing limited slip differential is provided with a ring gear and a sun gear which are placed coaxially, planetary gears which are engaged with these gears, and a planetary carrier for supporting the planetary gears in such a manner that the planetary gears rotate on their axes and revolve while making contact with and sliding against the surface of the teeth of the planetary gears. This limited slip differential allows for a differential motion between the two output axes on the basis of the rotation and the revolution of the planetary gears and limits the differential motion on the basis of the thrust friction force resulting from the rotation between the gears, which are engaged with each other and the frictional force between the surface of the teeth of the planetary gears and the planetary carrier which make contact with and slide against each other.

In the above described configuration, in which the surfaces of the teeth of the planetary gears make contact with and slide against the planetary carrier, the state of lubrication between the surfaces which slide against each other is extremely important. That is to say, lack of lubricant supplied between the surfaces which slide against each other may increase vibration and cause abnormal friction between the surfaces which slide against each other, which in turn causes seizing. Taking this into consideration, Japanese Laid-Open Patent Publication No. 2004-324736, for example, discloses a method for creating a plurality of irregular recesses on the surfaces of the teeth of the planetary gears. As a result, the state of lubrication between the surfaces which slide against each other is improved, so that the wear resistance and durability increase.

In recent years, a high level of quietness has been demanded for vehicles. Therefore, it is important in limited slip differentials to optimize the state of lubrication between the surfaces which slide against each other, from the point of view of improving the quietness, in addition to the wear resistance and durability.

In order to improve the quietness by reducing vibration in the limited slip differential, it is effective to make the coefficient of friction-sliding velocity characteristics ($\mu$–v characteristics) close to a positive gradient, that is to say, make the characteristics such that the coefficient of friction increases as the sliding velocity increases. Increase in the thickness of the film formed on the surfaces which slide against each other, that is to say, increase in the thickness of the lubricant film, promotes the shift from boundary lubrication to mixed lubrication, which shift is caused as the relative velocity between the planetary gears and the planetary carrier, or the sliding velocity, increases. In this case, a solid friction component is the main constituent of boundary lubrication, and the fluid friction component increases in mixed lubrication. Meanwhile, excessive restriction of increase in the thickness of the above described film increases reduction in the solid friction component as the sliding velocity increases. That is to say, the frictional force between the surfaces which slide against each other decreases and the vibration of the limited slip differential increases in either case. Accordingly, it is particularly important to improve the state of lubrication between the surfaces which slide against each other in an increasing phase of the sliding velocity in order to further improve the quietness.

SUMMARY OF THE INVENTION

An objective of the present invention is to provide a limited slip differential which optimizes the state of lubrication between surfaces which slide against each other, so that high quietness is ensured, an a manufacturing method for the limited slip differential.

To achieve the foregoing objective and in accordance with a first aspect of the present invention, a limited slip differential is provided that includes: a plurality of planetary gears; a planetary carrier for supporting the planetary gears in such a manner that the planetary gears can rotate on their axes and revolve while making contact with and sliding against a surface of teeth of the planetary gears; and a sun gear and a ring gear which are arranged coaxially with the planetary carrier and are allowed to differentially rotate by means of the planetary gears, wherein the limited slip differential limits differential motion generated between the sun gear and the ring gear. Irregular unevenness is created on at least either of the surface of the teeth of the planetary gears, and the sliding surface of the planetary carrier which makes contact with and slides against the surface of the teeth. The surface where the irregular unevenness is created has such a surface roughness that the maximum value of the power of a pitch of 40 µm to 60 µm as found through Fourier analysis is 0.4 µm to 1.2 µm.

In accordance with a second aspect of the present invention, a manufacturing method for a limited slip differential is provided. The limited slip differential includes: a plurality of planetary gears; a planetary carrier for supporting the planetary gears in such a manner that the planetary gears can rotate on their axes and revolve while making contact with and sliding against a surface of teeth of the planetary gears; and a sun gear and a ring gear which are arranged coaxially with the planetary carrier and are allowed to differentially rotate by means of the planetary gears, wherein the limited slip differential limits differential motion generated between the sun gear and the ring gear. The method includes: creating, through grinding process, irregular unevenness on at least either of the surface of the teeth of the planetary gears, and the sliding surface of the planetary carrier which makes contact with and slides against the surface of the teeth; and controlling the surface roughness of the surface where the irregular unevenness is created such that the ten point average roughness is 5 µm to 12 µm.

In accordance with a third aspect of the present invention, another manufacturing method for a limited slip differential is provided. The limited slip differential includes: a plurality of planetary gears; a planetary carrier for supporting the planetary gears in such a manner that the planetary gears can rotate on their axes and revolve while making contact with and sliding against a surface of teeth of the planetary gears; and a sun gear and a ring gear which are arranged coaxially with the planetary carrier and are allowed to differentially rotate by means of the planetary gears, wherein the limited slip differential limits differential motion generated between the sun gear and the ring gear. The method includes: creating, through grinding process, irregular unevenness on at least either of the surface of the teeth of the planetary gears, and the sliding surface of the planetary carrier which makes contact with and slides against the surface of the teeth; and controlling the surface roughness of the surface where the irregular unevenness is created such that the maximum value of the power of a pitch of 40 μm to 60 μm as found through Fourier analysis is 0.4 μm to 1.2 μm.

In accordance with a fourth aspect of the present invention, a limited slip differential is provided that includes: a plurality of planetary gears; a planetary carrier for supporting the planetary gears in such a manner that the planetary gears can rotate on their axes and revolve while making contact with and sliding against a surface of teeth of the planetary gears; and a sun gear and a ring gear which are arranged coaxially with the planetary carrier and are allowed to differentially rotate by means of the planetary gears, wherein the limited slip differential limits differential motion generated between the sun gear and the ring gear. A plurality of grooves having a predetermined inclination relative to the direction of rotation of the planetary gears are created on the surface of the teeth of the planetary gears or the sliding surface of the planetary carrier which makes contact with and slides against the surface of teeth.

In accordance with a fifth aspect of the present invention, a limited slip differential is provided that includes a plurality of planetary gears; a planetary carrier for supporting the planetary gears in such a manner that the planetary gears can rotate on their axes and revolve while making contact with and sliding against a surface of teeth of the planetary gears; and a sun gear and a ring gear which are arranged coaxially with the planetary carrier and are allowed to differentially rotate by means of the planetary gears, wherein the limited slip differential limits differential motion generated between the sun gear and the ring gear. A plurality of grooves having a predetermined inclination relative to the direction of rotation of the planetary gears are created on a surface of teeth of the planetary gears and a sliding surface of the planetary carrier which makes contact with and slides against the surface of the teeth.

DETAILED DESCRIPTION OF THE PREFERRED EMBODIMENTS

First Embodiment

In the following, a first embodiment of the present invention is described in reference to the drawings.

Figure 1:
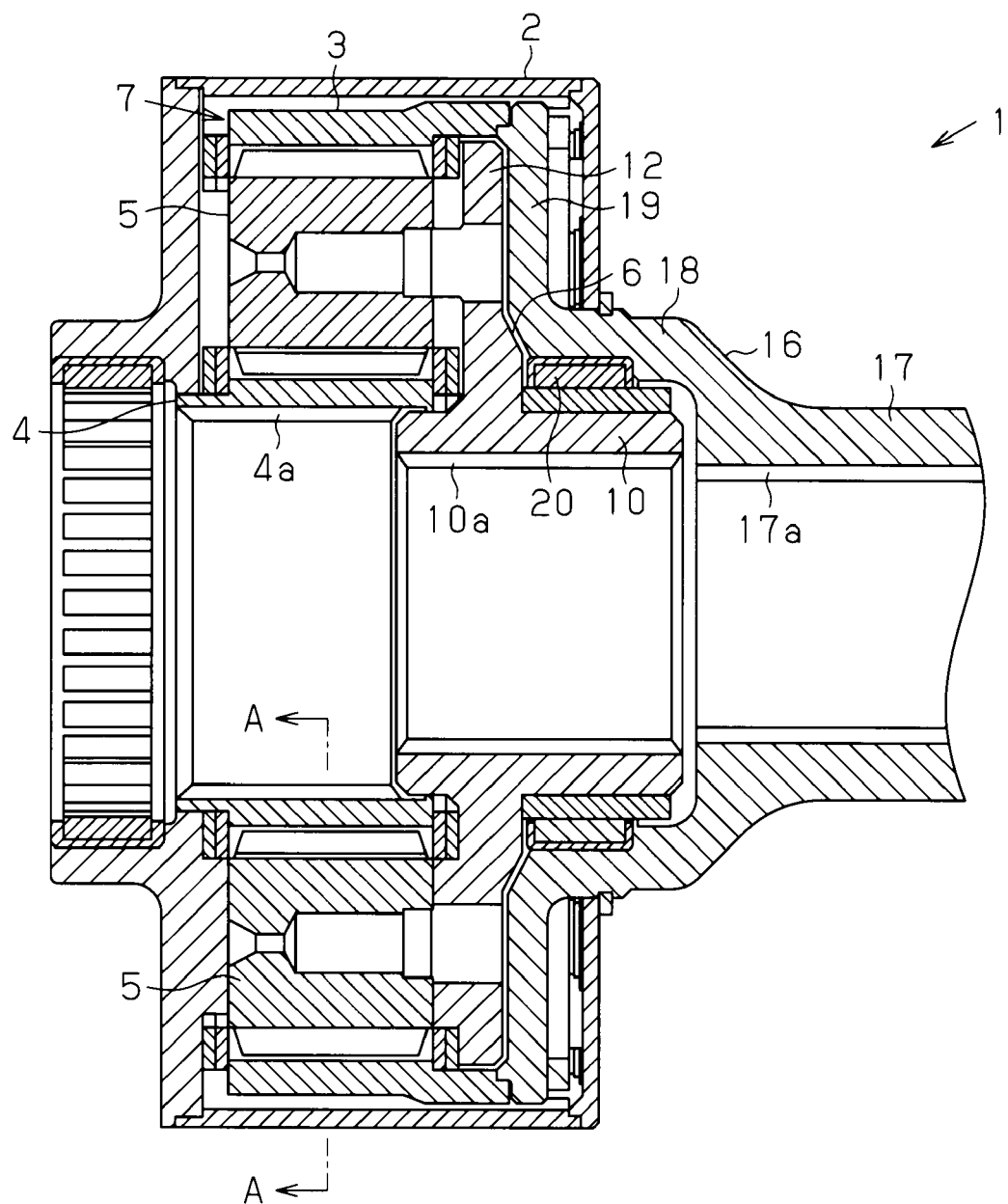
FIG. 1 is a cross-sectional view showing a limited slip differential.

As shown in FIG. 1, a limited slip differential 1 has a case 2 in substantially cylindrical form. A planetary gear mechanism 7 is accommodated in the case 2. The planetary gear mechanism 7 is formed of a ring gear 3, a sun gear 4, a plurality of planetary gears 5, and a planetary carrier 6. The sun gear 4 is coaxially arranged inside the ring gear 3. Each planetary gear 5 is engaged with the ring gear 3 and the sun gear 4. The planetary carrier 6 supports the planetary gears 5 in such a manner that they can rotate on their axes and revolve.

Figure 2:
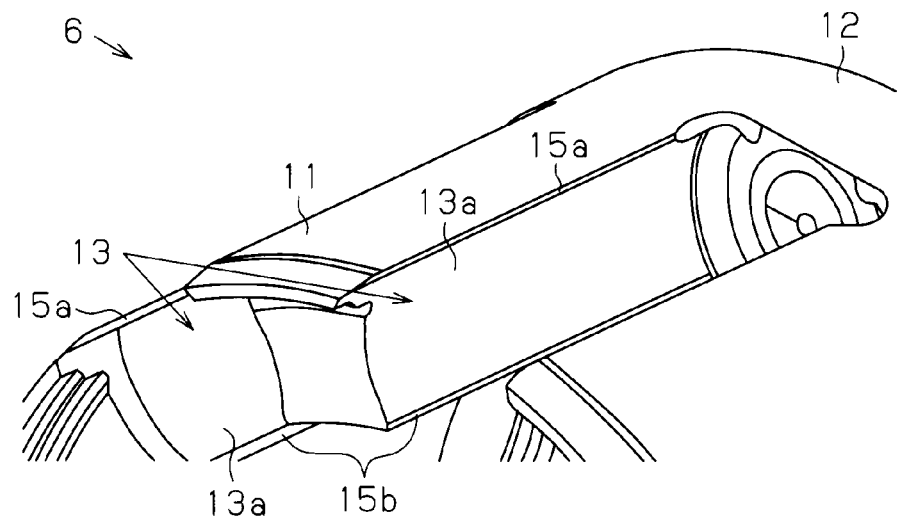
FIG. 2 is a perspective view showing a planetary carrier.
Figure 3:
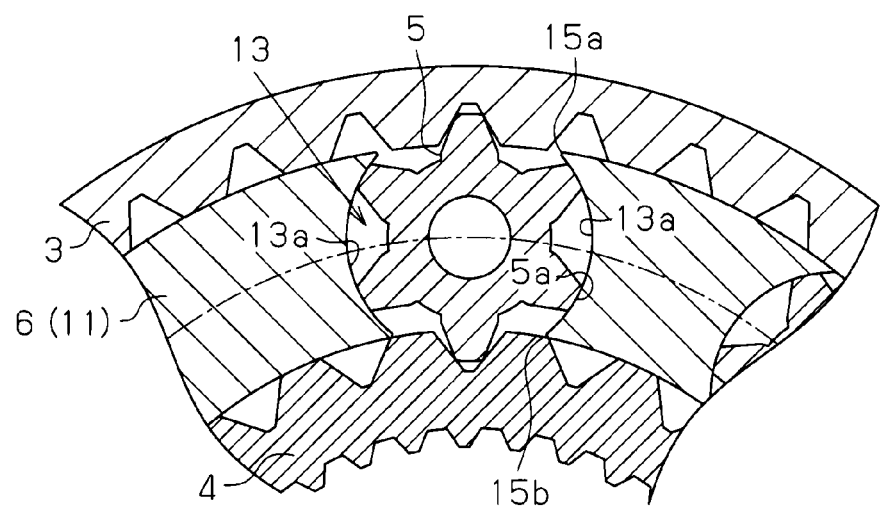
FIG. 3 is a cross-sectional view along line A-A in FIG. 1.

As shown in FIGS. 1 to 3, the planetary carrier 6 is provided with a shaft portion 10 and a support portion 11. The shaft portion 10 is coaxial with the sun gear 4, and arranged in such a manner as to be freely rotatable on the right of the sun gear 4 in FIG. 1. The support portion 11 supports the planetary gears 5 in such a manner that they are freely rotatable. The shaft portion 10 is hollow. A flange portion 12 which extends radially outward is formed in the outer periphery of the shaft portion 10. The support portion 11 extends in the axial direction from the flange portion 12. The support portion 11 is coaxially arranged between the ring gear 3 and the sun gear 4.

The support portion 11 is formed in substantially cylindrical form. The support portion 11 has a plurality of accommodating holes 13 which extend in the axial direction. The accommodating holes 13 are provided at predetermined intervals in the circumferential direction of the support portion 11. Each accommodating hole 13 is created so as to have a circular form in a cross section. The inner diameter of each accommodating hole 13 is greater than the outer diameter of the planetary gears 5. The difference between the inner diameter of the accommodating holes 13 and the outer diameter of the planetary gears 5 is slight. The inner diameter of the accommodating holes 13 is 1.005 to 1.05 times greater than the outer diameter of the planetary gears 5. As a result, the gap between the outer peripheral surface of the planetary gears 5 and the inner peripheral surface of the accommodating holes 13 in the vicinity of the ends on the inner periphery side and the outer periphery side of the accommodating holes 13 in the radial direction is greater than that in the vicinity of the center (portion shown by single-dot chain line in FIG. 3) in the radial direction of the accommodating holes 13. In addition, the inner diameter of the accommodating holes 13 is set greater than the thickness of the support portion 11 in the radial direction. As a result, two openings 15a and 15b are created on the outer peripheral surface and the inner peripheral surface of the support portion 11, respectively. The planetary gears 5 are accommodated in the accommodating holes 13.

The planetary gears 5 are supported in such a manner as to be freely rotatable with the surface 5a of the teeth making contact with and sliding against the wall surface 13a of the accommodating holes 13. At the same time, the planetary gears 5 are engaged with the ring gear 3 and the sun gear 4 through the openings 15a and 15b. In the limited slip differential 1 according to the present embodiment, helical gears are employed as the planetary gears 5.

As shown in FIG. 1, an output member 16 having a shaft portion 17 is linked to the ring gear 3. The shaft portion 17 is coaxial with the shaft portion 10 of the planetary carrier 6, and arranged on the right side of the planetary carrier 6 in FIG. 1. The shaft portion 17 is hollow, as is the shaft portion 10 of the planetary carrier 6. A large diameter portion 18 is provided at the end of the shaft portion 17 in the proximity of the planetary carrier 6 so as to surround the outer peripheral surface of the shaft portion 10 of the planetary carrier 6. The large diameter portion 18 is arranged in such a manner as to be coaxial with the planetary carrier 6. A flange portion 19 which extends radially outward is formed at the front end of the large diameter portion 18, that is to say, the left side of the large diameter portion 18 in FIG. 1. The output member 16 rotates together with the ring gear 3 in a state where the flange portion 19 is linked at the end of the ring gear 3 on the right side in FIG. 1.

The case 2 is linked to the large diameter portion 18 of the output member 16. As a result, the case 2 rotates together with the output member 16 and the ring gear 3. The planetary carrier 6 is supported by a bearing which is located between the shaft portion 10 of the planetary carrier 6 and the large diameter portion 18 of the output member 16, that is to say, a needle bearing 20, in such a manner as to be rotatable relative to the output member 16 and the ring gear 3. Furthermore, the sun gear 4 is hollow. The end of the sun gear 4 on the right side in FIG. 1 is engaged from the outside with the end of the shaft portion 10 of the planetary carrier 6 on the left side in FIG. 1 in such a manner as to be freely rotatable. As a result, the sun gear 4 is supported in such a manner as to be rotatable relative to the planetary carrier 6.

Spline engaging portions 4a, 10a, and 17a are formed on the inner peripheral surfaces of the sun gear 4, the shaft portion 10 of the planetary carrier 6, and the shaft portion 17 of the output member 16, respectively. In the present embodiment, the spline engaging portion 10a formed in the shaft portion 10 of the planetary carrier 6 is an input portion for drive torque, and the spline engaging portion 4a of the sun gear 4 and the spline engaging portion 17a formed on the shaft portion 17 of the output member 16 are first and second output portions, respectively.

That is to say, drive torque inputted in the planetary carrier 6 is transmitted to the sun gear 4 and the ring gear 3 (output member 16) which are engaged with the planetary gears 5 with a predetermined distribution ratio through the rotation and revolution of the planetary gears 5 supported by the planetary carrier 6 where the differential motion is allowed. In the present embodiment, the limited slip differential 1 is formed as a center differential gear for four-wheel drive vehicles. The drive shaft of the front wheels is linked to the sun gear 4, which is a first output portion, and the drive shaft for the rear wheels is linked to the ring gear 3, which is a second output portion. In the case where torque reaction force is generated in the drive system of the vehicle, the differential motion is limited, due to thrust friction force resulting from the rotation between the gears which are engaged with each other and the frictional force between the surfaces which make contact with and slide against each other, that is to say, between the surfaces 5a of the teeth of each planetary gear 5 and the sliding surface of the planetary carrier 6 (wall surface 13a of each accommodating holes 13).

Next, the groove structure on the sliding surface in the above described limited slip differential is described.

Figure 4:
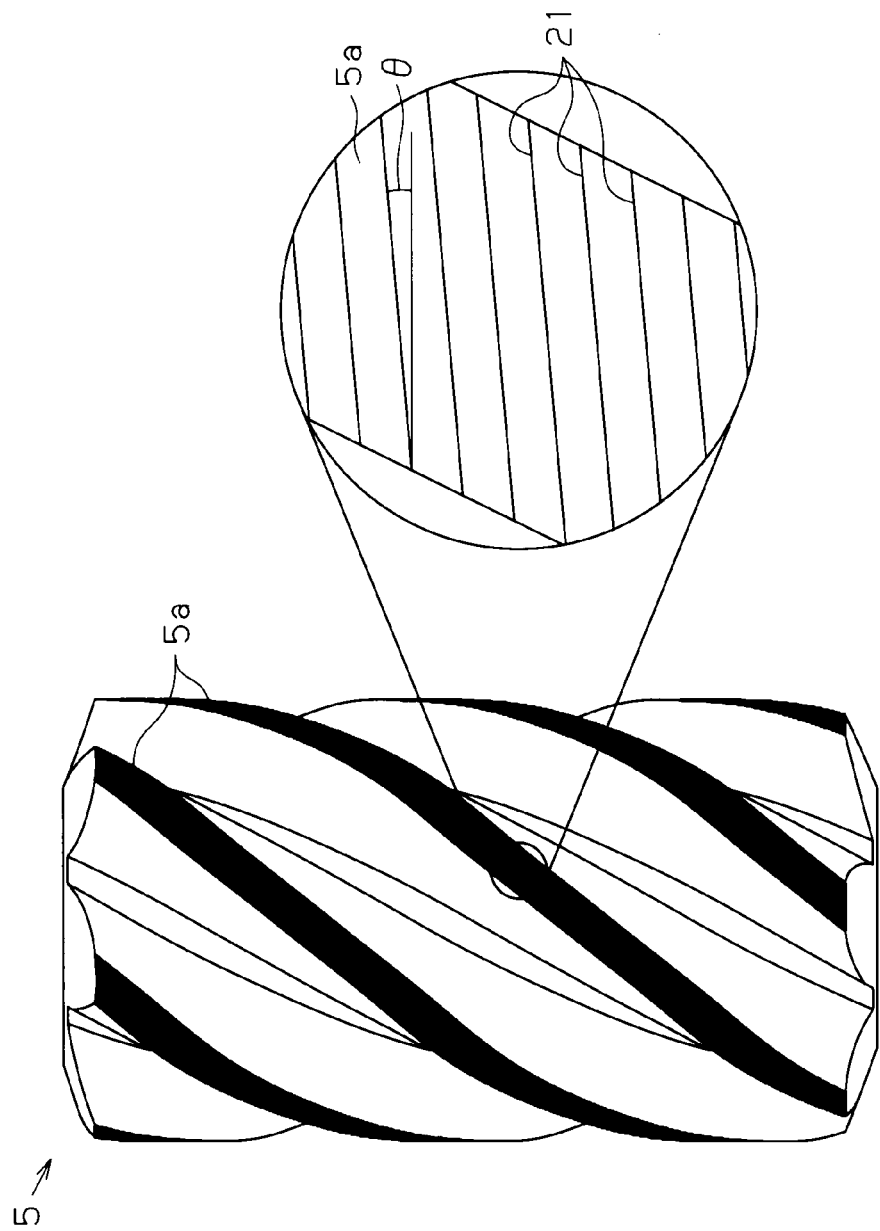
FIG. 4 is a diagram showing a planetary gear according to a first embodiment of the present invention and an enlargement of the surface of a tooth of the planetary gear.

As shown in FIG. 4, a plurality of grooves 21 are created on the surfaces 5a of the teeth of each planetary gear 5, which surface 5a forms a sliding surface in the limited slip differential 1. The grooves 21 function as lubricant grooves for supplying a lubricant to the space between sliding surfaces. The depth of the grooves is no less than 5 μm.

As the relative velocity (sliding velocity) between each planetary gear 5 and the planetary carrier 6 increases, the amount of lubricant supplied to the space between the sliding surfaces tends to increase. Increase in the thickness of the lubricant film, however, promotes the shift from boundary lubrication, of which the main constituent is a solid friction component, to mixed lubrication, where the fluid friction component is higher. In the limited slip differential 1 shown in FIG. 1, the vibration tends to increase due to reduction in the frictional force on the sliding surfaces, which is generated at the time of the shift from boundary lubrication to mixed lubrication.

However, the depth of the grooves 21 is set at 5 μm or greater as described above, and thus, excessive lubricant is absorbed by the grooves 21, even in the phase where the sliding velocity increases. As a result, the thickness of the lubricant film formed on each sliding surface is prevented from increasing, and thus, boundary lubrication is maintained. In further detail, when the surfaces 5a of a certain tooth enters an accommodating hole 13 from the inner periphery side or the outer periphery side of the planetary carrier 6, lubricant is introduced into the space between the surface 5a of the tooth and the wall surface 13a of the accommodating hole 13. At this time, excessive lubricant is discharged into the grooves 21 as the surface 5a of the tooth moves toward the center of the accommodating hole 13 in the radial direction, where the pressure between the surface 5a of the tooth and the wall surface 13a becomes maximum. As a result, boundary lubricant is maintained in the vicinity of the center of the accommodating hole 13 in the radial direction. Thus, vibration is prevented, so that high quietness is ensured. In addition, seizing is prevented by the presence of an appropriate amount of lubricant between the surface 5a of the tooth and the wall surface 13a.

The grooves 21 have a predetermined inclination θ relative to the direction of rotation of each planetary gear 5, that is to say, the circumferential direction of each planetary gear 5. Ten grooves 21 are in spiral form, for example, and make up one set. The inclination θ of the grooves 21 is an acute angle of 3° to 45°. These grooves in spiral form are created through cutting by pressing a cutting tool against the planetary gear 5 while rotating the planetary gear 5 in the circumferential direction and moving it in the axial direction.

The grooves 21 have a predetermined inclination θ, and thus, the surfaces 5a of the teeth of each planetary gear 5 always make contact with and slide against the sliding surface of the planetary carrier 6, that is to say, the wall surface 13a of each accommodating hole 13 in different portions. As a result, the portion of the sliding surface of the planetary carrier 6 which wears out as a result of the contact with portions other than the grooves 21 on the surface 5a of the teeth of the planetary gears 5 periodically and regularly change as the planetary gears 5 rotate within the accommodating holes 13. As a result, the sliding surface wears out uniformly, and thus, high quietness is maintained over a long period of time. In addition, in the case where the inclination relative to the direction of rotation is set at 45° or greater, the dynamic pressure (hydraulic reaction force) which accompanies increase in the sliding velocity increases in the phase where the sliding velocity increases, and thus, there is a possibility that the shift to mixed lubrication may be promoted. Accordingly, it is desirable for the inclination θ of the grooves 21 to be set at an acute angle of 3° to 45°.

An ion nitriding treatment is carried out on the wall surface 13a of each accommodating hole 13, which is a sliding surface. A process for forming multilayer thin films from tungsten carbide/diamond-like carbon is carried out on the surfaces 5a of the teeth of each planetary gears 5. The grooves 21 are created on the surface having a higher surface hardness between the wall surface 13a of the accommodating holes 13 and the surface 5a of the teeth of the planetary gears 5, which slide against each other. As a result, the remaining portion after the creation of the grooves 21, that is to say, the land portions, are prevented from being worn.

According to the present embodiment described above, the following operations and advantages are achieved.

(1) A plurality of grooves 21 are created on the surface 5a of the teeth of each planetary gear 5. The grooves 21 have a predetermined inclination θ relative to the direction of rotation of each planetary gear 5, that is to say, in the circumferential direction of the planetary gears 5.

As disclosed in Japanese Laid-Open Patent Publication No. 8-178017, for example, in the conventional configuration, where lubricant grooves in net form are created, small protrusions which remain after the creation of the lubricant grooves make contact with and slide against particular portions on the sliding surface of the planetary carrier. Therefore, the sliding surface of the planetary carrier wears out unevenly. In addition, the vibration gradually increases after use over a long period of time, so that the original quietness cannot be maintained. Furthermore, more lubricant than necessary is supplied to the space between the protrusions and the sliding surface of the planetary carrier. Therefore, the shift from "boundary lubrication" to "fluid lubrication" is promoted, and as a consequence, vibration may be generated.

In this respect, according to the present invention, the surfaces 5a of the teeth of each planetary gear 5 always make contact with and slide against the sliding surface of the planetary carrier 6, that is to say, the wall surfaces 13a of the accommodating holes 13, in different portions as the planetary gears 5 rotate within the accommodating holes 13. As a result, the sliding surface wears out uniformly, and high quietness is maintained over a long period of time.

(2) A surface treatment is carried out on the surfaces 5a of the teeth of each planetary gear 5 where the grooves 21 are created, so that the surface hardness becomes higher than the wall surface 13a of the accommodating holes 13 which makes contact with and slides against the surface 5a of the teeth. As a result, land portions which remain after the creation of the grooves 21 are prevented from being worn.

(3) A plurality of grooves 21 are in spiral form and make up a set. As a result, a plurality of grooves having a predetermined inclination are easily formed with precision.

Second Embodiment

In the following, a second embodiment of the present invention is described in reference to the drawings. The main difference between the present embodiment and the first embodiment is only the structure on the surfaces 5a of the teeth of each planetary gear 5. Therefore, for the sake of convenience, in the description, the same reference numerals are attached to components which are the same as in the first embodiment, and description thereof is omitted.

Figure 6:
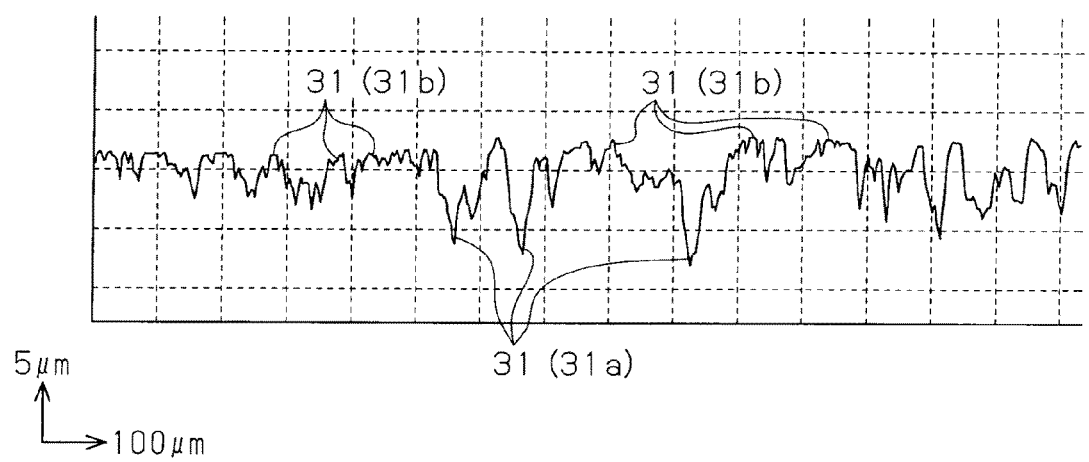
FIG. 6 is a graph showing the profile of the surface of a tooth of a planetary gear according to a second embodiment in a cross section (cross section along line B-B in FIG. 5)

As shown in FIG. 6, in the limited slip differential 1 according to the present embodiment, a plurality of microscopic grooves 31 are created on the surfaces 5a of the teeth of each planetary gear 5. As a result, irregular unevenness is created on the surfaces 5a of the teeth of each planetary gear 5.

In further detail, a plurality of first microscopic grooves 31a which are relatively deep and function as lubricant grooves and a plurality of second microscopic grooves 31b which are shallower than the first microscopic grooves 31a are created on the surfaces 5a of the teeth of each planetary gear 5. The state of lubrication between the sliding surfaces is optimized by the first microscopic grooves 31a and the second microscopic grooves 31b, so that shift from boundary lubrication to mixed lubrication is prevented in the phase where the relative velocity (sliding velocity) between the planetary gears 5 and the planetary carrier 6 increases, and the quietness improves.

That is to say, frictional force between the sliding surfaces is generated as a result of a solid friction component resulting from the contact between solids, and a fluid friction component in a state where a fluid is interposed. The state of lubrication on the sliding surface can be divided into three types: "boundary lubrication," of which the main constituent is a solid friction component, "fluid lubrication," of which the main constituent is a fluid friction component, and "mixed lubrication," where the two friction components are mixed. The relationship between the coefficient of friction μ and the sliding velocity (v) on the sliding surfaces in the case where the viscosity of the lubricant and the load applied to the sliding surfaces are constant varies along the curve shown in FIG. 7, that is to say, along the Stribeck curve in accordance with the sliding velocity v.

Figure 7:
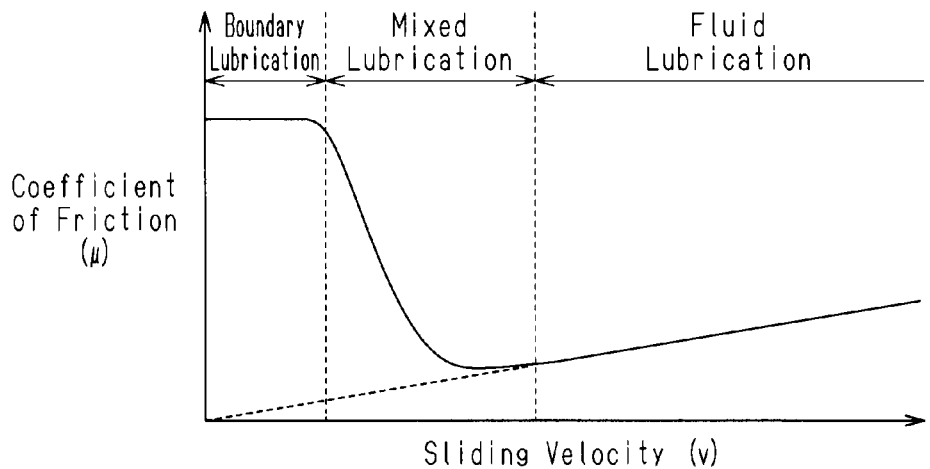
FIG. 7 is a graph illustrating the relationship between the coefficient of friction on the surfaces which slide against each other and the sliding velocity.

Although the state of lubrication in the limited slip differential is basically boundary lubrication, as shown in FIG. 7, the state of lubrication between the sliding surfaces shifts from boundary lubrication to mixed lubrication as the sliding velocity v increases. As a result of the reduction in the frictional force on the sliding surface at the time of the above described shift from boundary lubrication to mixed lubrication, the vibration in the limited slip differential tends to increase. Accordingly, it is important to improve the state of lubrication in the phase where the sliding velocity v increases, in order to further improve the quietness.

Figure 8A:
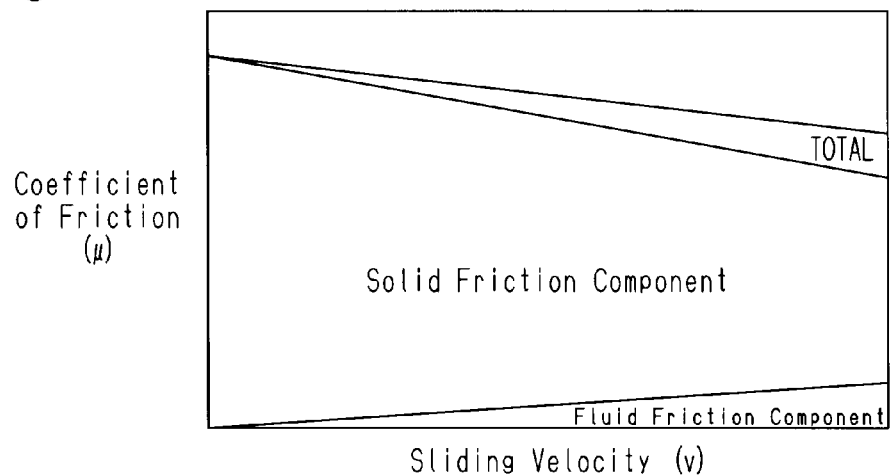
FIGS. 8(A) and 8(B) are graphs showing the relationship between the coefficient of friction and the sliding velocity in a phase where the sliding velocity increases.

As shown in FIG. 8(A), the solid friction component usually decreases as the sliding velocity v increases, and as a result, the coefficient of friction lowers as a whole. That is to say, the coefficient of friction-sliding velocity characteristics (μ–v characteristics) exhibit a negative gradient.

As in the limited slip differential 1 according to the present embodiment, however, a plurality of relatively deep first microscopic grooves 31a and a plurality of second microscopic grooves 31b which are shallower than the first microscopic grooves 31a are created on the surfaces 5a of the teeth of each planetary gear 5. Thus, the μ–v characteristics are made close to a positive gradient.

Figure 8B:
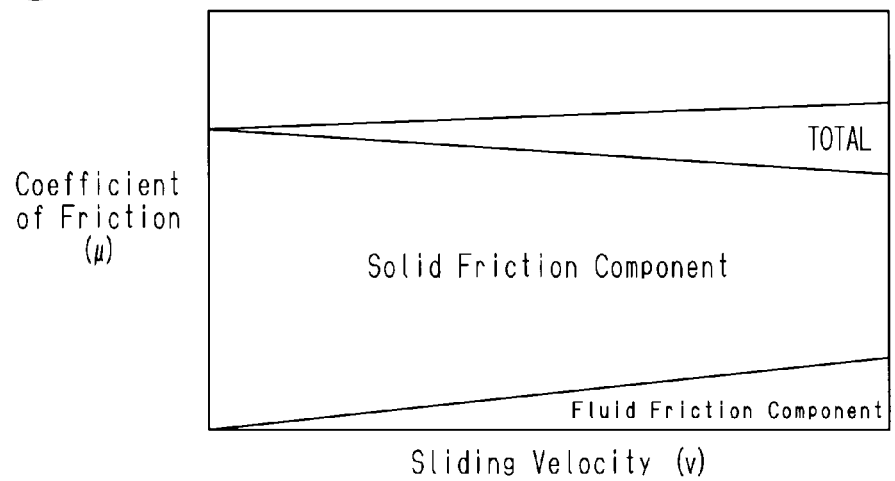

That is to say, as shown in FIG. 8(B), the thickness of the film on the sliding surfaces is prevented from becoming excessive due to the first microscopic grooves 31a, which function as lubricant grooves, and therefore, the solid friction component is maintained. At the same time, the fluid friction component, which increases as the sliding velocity increases, can be added by the second microscopic grooves 31b, without creating a film having an excessive thickness on the sliding surfaces. As a result, the state of lubrication on the sliding surfaces can be optimized, so that vibration is prevented in the phase where the sliding velocity v increases, and high quietness is secured.

Figure 9:
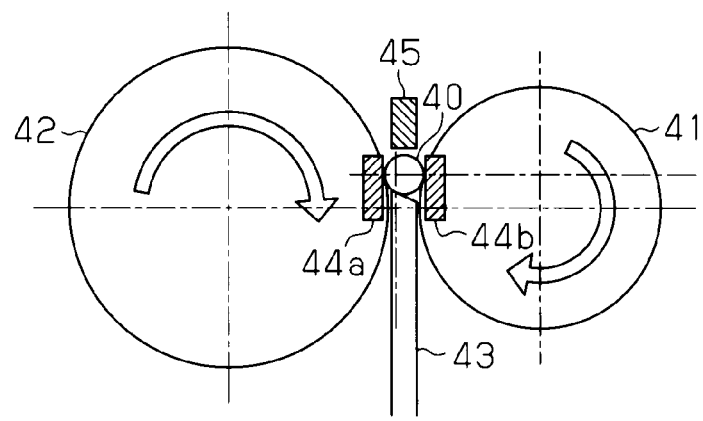
FIG. 9 is a diagram illustrating a centerless grinding method.

In further detail, in the present embodiment, the irregular unevenness on the surfaces 5a of the teeth of each planetary gear 5, that is to say, the first microscopic grooves 31a and the second microscopic grooves 31b, is created through a grinding process. Concretely, the centerless grinding technique shown in FIG. 9 is adopted as the method for a grinding process.

The centerless grinding technique is a technique for carrying out a grinding process on the planetary gear 5, which is the object of grinding 40 and held by an adjustment wheel 41, a grinding wheel 42, a blade 43, guide plates 44a and 44b, and a pressing plate 45, without securing the axis of the planetary gear 5. The object of grinding 40 is processed with the location of the axis automatically adjusted through the clearance between the object of grinding 40 and the above described members. The adjustment wheel 41 feeds out the object of grinding 40 in the axial direction while rotating the object of grinding 40 in the direction opposite to the grinding wheel 42. The blade 43 determines the clearance between the object of grinding 40 and the adjustment wheel 41, as well as that between the object of grinding 40 and the grinding wheel 42.

The surface roughness of the surface 5a of the teeth of each planetary gear 5, where irregular unevenness, that is to say, the first microscopic grooves 31a and the second microscopic grooves 31b, is created through the above described grinding process is controlled so as to have a ten point average roughness (RzJIS) of 5 μm to 12 μm, and the maximum value of the power of a pitch of 40 μm to 60 μm as found through Fourier analysis (FFT: fast Fourier transformation) is controlled to be 0.4 μm to 1.2 μm. The power of a pitch of 40 μm to 60 μm is focused on because the roughness of the pitch in this range affects the maintenance of the solid friction component. That is to say, a roughness having a pitch which exceeds 60 μm does not allow the lubricant film to be shaken off, and thus, the solid friction component cannot be maintained. In addition, a roughness having a pitch of less than 40 μm allows for friction after use over a long period of time, and thus, the solid friction component cannot be maintained. Fourier analysis is a method for analyzing wave profile through Fourier transformation. In the present embodiment, the pitch from 40 μm to 60 μm indicates that a measurement range of the surface 5a of the teeth of each planetary gear 5 is in the range from 40 μm to 60 μm. That is to say, the power of a pitch from 40 μm to 60 μm indicates that a power spectrum, which is obtained by analyzing the profile of the surface 5a of the teeth in the measurement range from 40 μm to 60 μm through Fourier transformation. In other words, the power of a pitch from 40 μm to 60 μm indicates the power of roughness component of the surface Sa of the teeth of each planetary gear 5.

Next, the appropriateness of the control indices as described above is examined.

This evaluation for the appropriateness uses the "negative gradient of the μ–v characteristics," that is, an index which represents the ratio with which the coefficient of friction μ between the two sliding surfaces lowers when the sliding velocity v between the two sliding surfaces of the planetary gears and the planetary carrier changes from the low rotation region (10 rpm) to the high rotation region (80 rpm). The closer to zero the "negative gradient of the μ–v characteristics" is, the smaller the change in the coefficient of friction μ is. This means that the frictional force between the sliding surfaces hardly lowers, and vibration is hardly generated even in the phase where the sliding velocity v increases.

First, the appropriateness of control using the ten point average roughness is examined.

Figure 10:
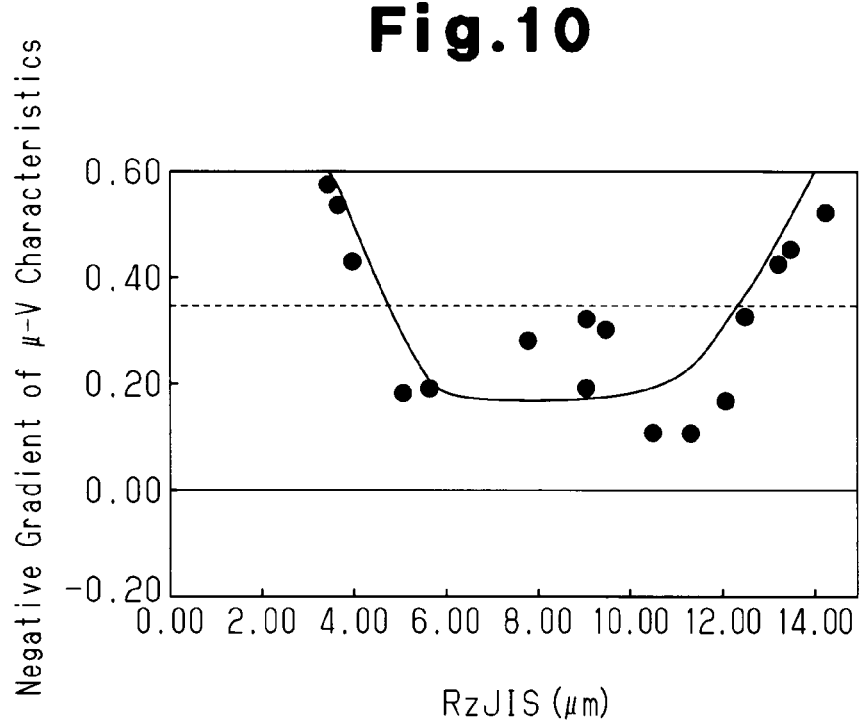
FIG. 10 is a graph showing the relationship between the ten point average roughness (RzJIS) and the "negative gradient of μ-v characteristics"

As shown in FIG. 10, the greater the ten point average roughness is, the smaller the value of the "negative gradient of the μ–v characteristics" is. The negative gradient of the μ–v characteristics has a substantially constant value within a range where the ten point average roughness is approximately 6 μm to approximately 11 μm. Thereafter, the greater the ten point average roughness is, the greater the value of the "negative gradient of the μ–v characteristics" is.

The ten point average roughness is the sum of the average of the highest five deviation values and the average of the absolute value of the lowest five deviation values, from among the deviation values from the average value. That is to say, the ten point average roughness can be regarded as an index which indicates the depth of the relatively deep microscopic grooves, or the first microscopic grooves 31a that function as lubricant grooves. Accordingly, as can be seen from the graph shown in FIG. 10, where the ten point average roughness is controlled within a range from approximately 6 μm to approximately 11 μm, the depth of the first microscopic grooves 31a is the optimal depth for allowing the grooves to function as lubricant grooves.

Figure 11:
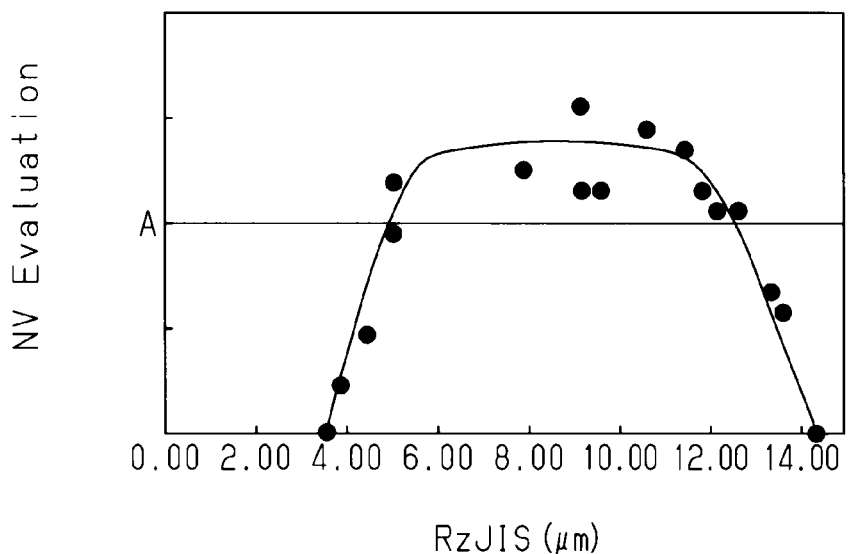
FIG. 11 is a graph showing the relationship between the ten point average roughness (RzJIS) and the vibration characteristics (NV evaluation)

As shown in FIG. 11, the greater the ten point average roughness is, the higher the value of the NV evaluation is. The NV evaluation has a substantially constant value within a range where the ten point average roughness is approximately 6 μm to approximately 11 μm. Thereafter, the greater the ten point average roughness is, the smaller the value of the NV evaluation is. That is to say, this tendency is the same as the tendency in the above described relationship between the "negative gradient of the μ–v characteristics" and the ten point average roughness, and high quietness (little vibration) is ensured in the vicinity of the corresponding region. NV evaluation is a score using sensory evaluation, and the higher the score is, the less vibration there is.

In this sensory evaluation test, when the NV evaluation is at height A or higher in the graph shown in FIG. 11, the evaluation is that there is little vibration and the quietness is excellent. Accordingly, it is concluded that it is appropriate to control the ten point average roughness of the surfaces 5a of the teeth of the planetary gears 5 so that the ten point average roughness is in a range from 5 μm to 12 μm, where the NV evaluation exceeds the above described height A.

The values of both the "negative gradient of the μ–v characteristics" and the NV evaluation become substantially constant and the most appropriate values in a range where the ten point average roughness is approximately 6 μm to approximately 11 μm. Accordingly, taking this into consideration, it is desirable to control the ten point average roughness so that it is in a range from approximately 6 μm to approximately 11 μm. In the case, the quietness further improve, and the quality can be stabilized at a high level.

Next, the appropriateness of control using Fourier analysis (FFT: fast Fourier transform) is examined.

Figure 12:
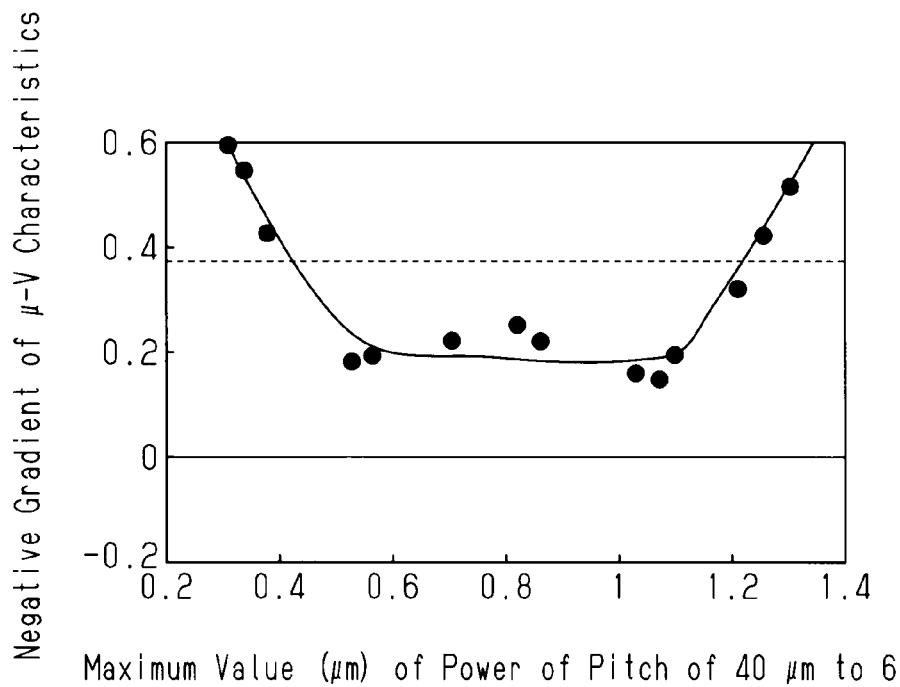
FIG. 12 is a graph showing the relationship between the maximum value of the power of a pitch of 40 μm to 60 μm as found through FFT and the "negative gradient of μ-v characteristics"

As shown in FIG. 12, the greater the maximum value of the power of a pitch from 40 μm to 60 μm is, the smaller the value of the "negative gradient of the μ–v characteristics" is. The negative gradient of the μ–v characteristics has a substantially constant value in a range where the maximum value of the power is approximately 0.6 μm to approximately 1.1 μm. Thereafter, the greater the maximum value of the power is, the greater the value of the "negative gradient of the μ–v characteristics" is.

That is to say, the maximum value of the power of a pitch from 40 μm to 60 μm allows the relatively shallow microscopic grooves, or the second microscopic grooves 31b to be controlled. Namely, when the maximum value of the power as found through FFT is high, the number of second microscopic grooves 31b created on the surface 5a of the teeth is much greater. The data shown in the graph of FIG. 12 does not simply mean that the greater the number of second microscopic grooves 31b is, the better, but it shows that there is an optimal range for the number.

Accordingly, it is desirable that the surface roughness of the surface 5a of the teeth of the planetary gears 5 be controlled within such a range that the maximum value of the power of a pitch from 40 μm to 60 μm as found through FFT is approximately 0.6 μm to approximately 1.1 μm. The range of the "negative gradient of the μ–v characteristics" in the control using the ten point average roughness (see FIG. 10, corresponding to RzJIS of 5 μm to 12 μm) is applied to the graph shown in FIG. 12, and thus, a range of control from 0.4 μm to 1.2 μm is derived.

Next, the reason why there is an optimal range for the number of the second microscopic grooves 31b created on the surfaces 5a of the teeth, or the roughness of the microscopic groove, is examined.

Figure 13A:
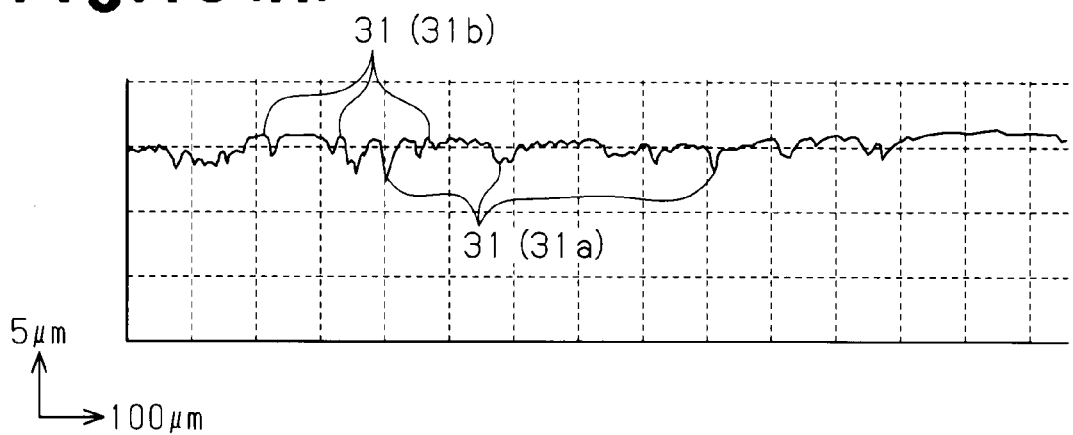
FIGS. 13(A), 13(B), and 13(C) are profiles of the surface of a tooth of a planetary gear in a cross section.
Figure 13B:
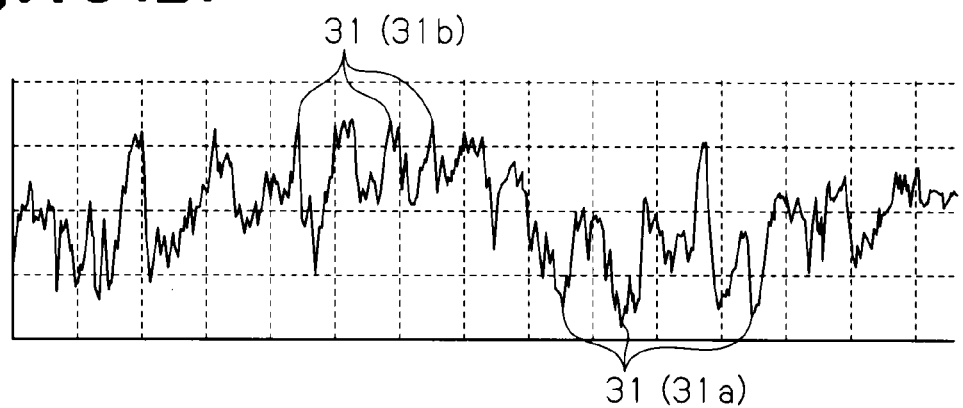
Figure 13C:
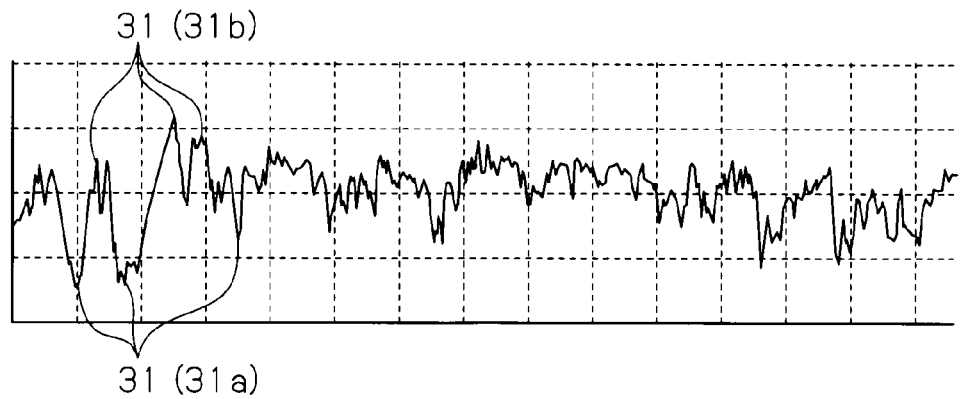

FIG. 13(A) shows the profile of the surface of the teeth in a cross section in the case where the maximum value of the power of a pitch from 40 μm to 60 μm is less than 0.4 μm (see FIG. 5, cross section along B-B, and FIG. 6), and FIG. 13(B) shows the profile in a cross section in the case where the maximum value of the power exceeds 1.2 μm. FIG. 13(C) shows the profile in a cross section in the case where the maximum value of the power is within a range from approximately 0.4 μm to approximately 1.2 μm (substantially in the middle).

As shown in FIG. 13(A), there are few grooves corresponding to the second microscopic grooves 31b in the profile of the surface of the teeth in a cross section in the case where the maximum value of the power of a pitch from 40 μm to 60 μm is less than 0.4 μm, and thus, the surface is substantially flat. Therefore, a sufficient fluid friction component as described above cannot be applied. As a result, the μ–v characteristics cannot be converted to a positive gradient, and thus, it is assumed that the "negative gradient of the μ–v characteristics" cannot be prevented from lowering.

As shown in FIG. 13(B), although there is sufficient roughness in the microscopic grooves in the profile of the surface of the teeth in a cross section in the case where the maximum value of the power of a pitch of 40 μm to 60 μm exceeds 1.2 μm, portions which become the sliding surface are in an undulated state. This is inferred to be caused by the fact that the strength of the land portions cannot be ensured when a great number of second microscopic grooves 31b are created, and as a result, the land portions break. The substantial area for sliding is reduced due to the undulation in portions which become the sliding surface, and thus, it is considered that increase in the "negative gradient of the μ–v characteristics," that is to say, conversion of the μ–v characteristics to a negative gradient, is caused.

In this respect, as shown in FIG. 13(C), in the case where the maximum value of the power is within a range from approximately 0.4 μm to approximately 1.2 μm, there is no undulation in portions which become the sliding surface, unlike the profile in a cross section in FIG. 13(B), and thus, there is sufficient roughness in the microscopic grooves. Accordingly, it is preferable to control the surface roughness of the surface 5a of the teeth of the planetary gears 5 so that the maximum value of the power of a pitch of 40 μm to 60 μm as found through FFT becomes 0.4 μm to 1.2 μm as described above. By doing so, a sufficient fluid friction component is added by the roughness in the microscopic grooves even in the phase where the sliding velocity v increases. As a result, the μ–v characteristics can be converted to a positive gradient, and high quietness is ensured.

In the same manner as the control using the ten point average roughness, it is desirable to control the maximum value of the power of a pitch of 40 μm to 60 μm so that it is in a range from approximately 0.6 μm to approximately 1.1 μm, taking into consideration the fact that the value of the "negative gradient of the μ–v characteristics" is approximately constant and the most appropriate value within such a range that the maximum value of the power of a pitch from 40 μm to 60 μm as found through FFT is approximately 0.6 μm to approximately 1.1 μm. Furthermore, it is more preferable for the lower limit of the range for control to be 0.8 μm or greater in the case where the performance of adding a fluid friction component by the roughness in the microscopic grooves is ensured.

As described above, the following operations and advantages are achieved according to the present embodiment.

(1) A plurality of microscopic grooves 31 are created on the surface 5a of the teeth of each planetary gear 5, and thus, irregular unevenness is created. This irregular unevenness includes a plurality of first microscopic grooves 31a, which function as lubricant grooves, and a plurality of second microscopic grooves 31b, which are shallower than the first microscopic grooves 31a.

That is to say, the first microscopic grooves 31a, which function as lubricant grooves, prevent a film having an excessive thickness from being formed on the sliding surfaces, and a solid friction component on the sliding surface is maintained. At the same time, the second microscopic grooves 31b allow a fluid friction component, which increases as the sliding velocity increases, to be added without the formation of a thick film having an excessive thickness on the sliding surfaces. Accordingly, the state of lubrication on the sliding surfaces is optimized so that vibration can be prevented and high quietness is ensured, even in the phase where the sliding velocity v increases.

(2) The surface roughness of the surfaces 5a of the teeth of each planetary gear 5 is controlled so that the ten point average roughness (RzJIS) is 5 μm to 12 μm. In this configuration, the depth of the first microscopic grooves 31a can be set to the optimum depth in order for the first microscopic grooves to function as lubricant grooves.

(3) The surface roughness of the surface 5a of the teeth of the each planetary gear 5 is controlled so that the maximum value of the power of a pitch of 40 μm to 60 μm, as found through Fourier analysis (FFT: fast Fourier transformation), is 0.4 μm to 1.2 μm. In this configuration, a great number of second microscopic grooves 31b can be created without causing any undulations in portions which become the sliding surfaces. That is to say, a sufficient roughness in the microscopic grooves is provided in order to add a fluid friction component in the phase where the sliding velocity v increases.

Each of the above described embodiments may be modified as follows.

In the first embodiment, the grooves 21 having a predetermined inclination θ relative to the direction of rotation are created on the surfaces 5a of the teeth of each planetary gear 5. However, the grooves 21 having this predetermined inclination θ may be created on the wall surface 13a of each accommodating hole 13. In this case, it is desirable to carry out a surface treatment on the wall surface 13a of each accommodating holes 13 in order to increase the surface hardness, and thus, preventing the land portions from being worn.

Grooves 21 having a predetermined inclination θ may be created on both the surfaces 5a of the teeth of each planetary gear 5 and the wall surface 13a of each accommodating hole 13 which make contact with and slide against the surfaces 5a. That is to say, the two members where grooves 21 are created at a pitch of, for example, 100 μm are made to make contact with each other with a shift of phase corresponding to half the pitch, and thus, the relative pitch width is made to be 50 μm, which is half the pitch of the grooves in the respective members. Accordingly, the same advantages are gained as in the case where grooves at a more microscopic pitch are created in accordance with a more difficult manufacturing method.

Furthermore, grooves 21 having a predetermined inclination θ may be created on the sliding surfaces of each planetary gear 5 and each accommodating holes 13, which slide against each other in such a manner that the grooves 21 on these two members, which slide against each other, intersect. As a result, the wearing of the sliding surfaces is made more even.

In the second embodiment, the irregular unevenness, including a plurality of first microscopic grooves 31a, which function as lubricant grooves, and a plurality of second microscopic lubricant grooves 31b, which are shallower than the first microscopic grooves 31a, is created on the surfaces 5a of the teeth of each planetary gear 5. However, such irregular unevenness may be created on the wall surface 13a of each accommodating hole 13 or on both of the surfaces 5a of the teeth of each planetary gear 5 and the wall surface 13a of each accommodating hole 13.

Figure 14:
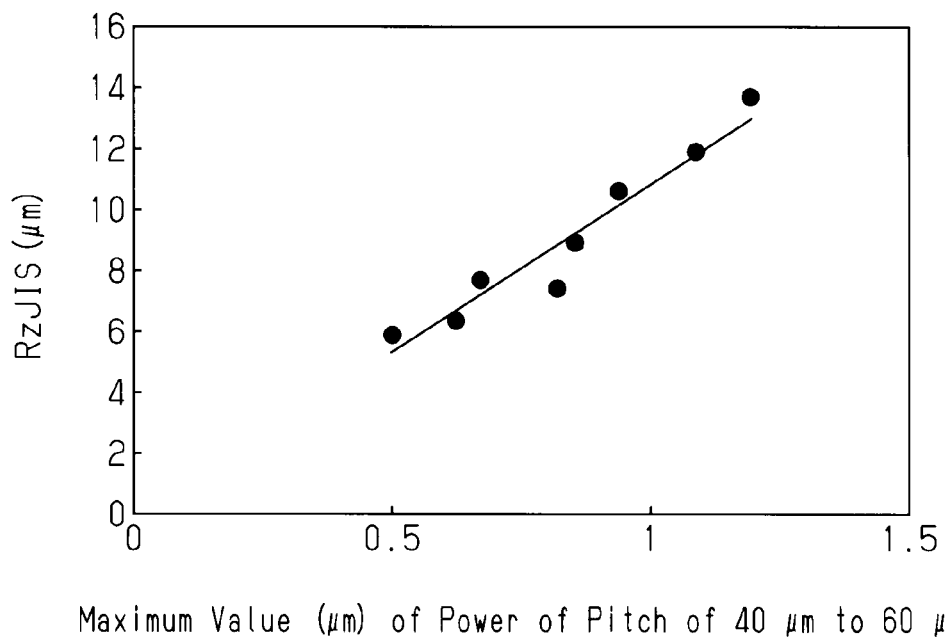
FIG. 14 is a graph showing the relationship between the ten point average roughness (RzJIS) and the maximum value of the power of a pitch of 40 μm to 60 μm as found through FFT.

In the second embodiment, the surface roughness of the surfaces 5a of the teeth of each planetary gear 5 is controlled so that the ten point average roughness (RzJIS) is 5 μm to 12 μm and the maximum value of the power of a pitch of 40 μm to 60 μm, as found through Fourier analysis (FFT: fast Fourier transform), is 0.4 μm to 1.2 μm. However, in the case where the irregular unevenness on the surfaces 5a of the teeth of each planetary gear 5 is created in accordance with a centerless grinding technique (see FIG. 9), as in the second embodiment, there is a correlation between the ten point average roughness and the maximum value of the power of a pitch of 40 μm to 60 μm, as found through FFT as shown in FIG. 14. Accordingly, in the case where this technique is used, the surface roughness of the surfaces 5a of the teeth of each planetary gear 5 may be controlled by using either the ten point average roughness or the maximum value of the power of a pitch of 40 μm to 60 μm, as found through FFT.

Figure 15:
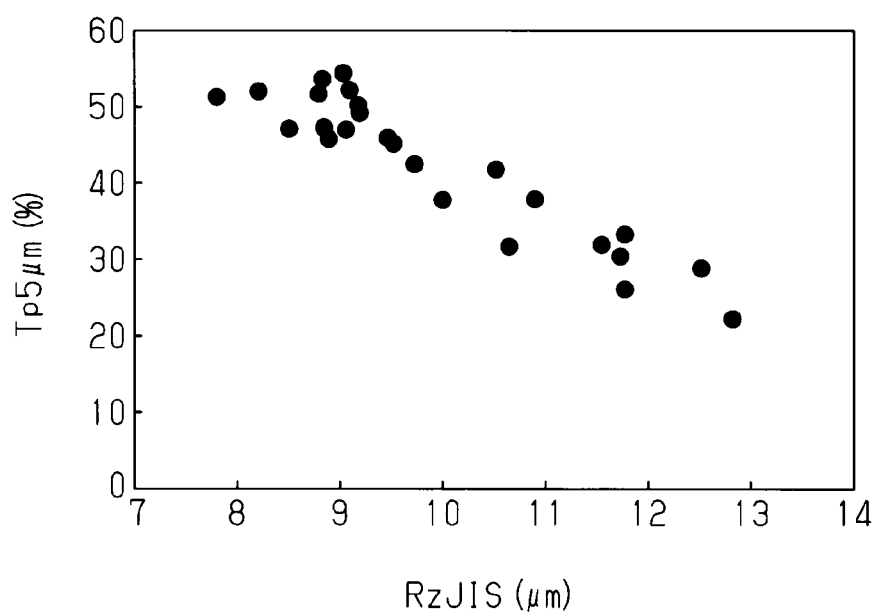
FIG. 15 is a graph showing the relationship between the ten point average roughness (RzJIS) and the contact area ratio (Tp) at a depth of 5 μm.

As shown in FIG. 15, there is a correlation between the ten point average roughness (RzJIS) and the contact area ratio (Tp) at a depth of 5 μm at least in a specific range (range shown in the graph in FIG. 15). Accordingly, the contact area ratio (Tp) at a depth of 5 μm may be used together in order to control the surface roughness of the sliding surfaces. The range for control in this case may be set to 30% to 60%. As a result, quality control with higher precision becomes possible. The contact area ratio at a depth of 5 μm refers to a ratio of the cross-sectional area to the whole surface area at the depth of 5 μm from the highest portion in an uneven portion on the surface 5a of the planetary gear 5, which serves as a sliding surface.

Figure 5:
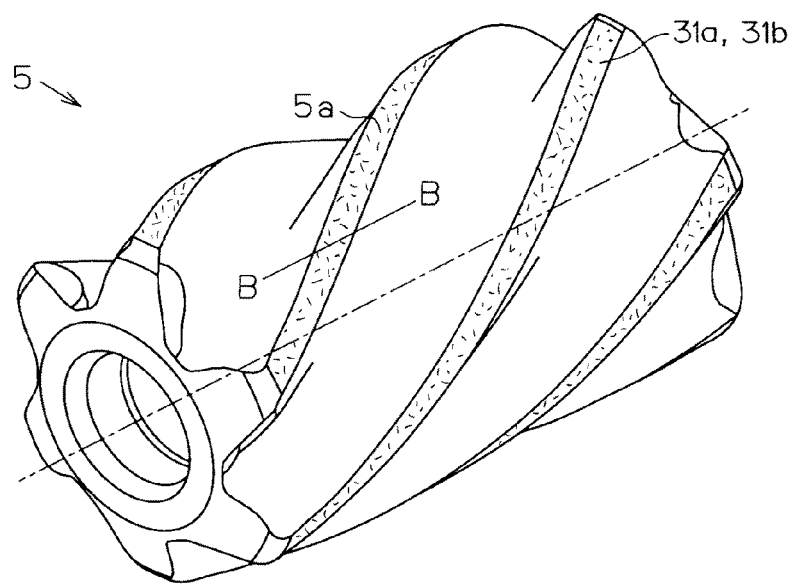
FIG. 5 is a perspective view showing a planetary gear.

Other than the limited slip differential 1 shown in FIG. 1, the present invention may be applied to any device having a sliding surface on any of the gears that form a planetary gear mechanism. That is to say, the invention may be applied to a device having the configuration described in, for example, Japanese Laid-Open Patent Publication No. 7-71562, a device having the configuration described in Japanese Laid-Open Patent Publication No. 7-332466, or a twin differential type device disclosed in Patent Document 1 (FIGS. 5 and 6).

Furthermore, the present invention may be implemented in a combination of the configuration in the first embodiment and the configuration in the second embodiment. For example, grooves 21 having a predetermined inclination θ relative to the direction of rotation as shown in the first embodiment may be created on the surfaces 5a of the teeth of each planetary gear 5, and irregular unevenness as that shown in the second embodiment may be created on the wall surface 13a of each accommodating hole 13. In addition, the combination of these may be reversed.

Although a configuration where torque inputted into the planetary carrier 6 is outputted from the ring gear 3 and the sun gear 4 is described in the respective embodiments, the present invention is not limited to this, but may be applied to a configuration where torque inputted into the ring gear 3 is outputted from the planetary carrier 6 and the sun gear 4.

Limited slip differentials, to which the present invention is applied, are not limited to devices where a sun gear, a planetary carrier, planetary gears, and a ring gear are aligned in the radial direction. For example, as described in Japanese Laid-Open Patent Publication Nos. 10-153249 and 5-280596, coaxially arranged first and second sun gears may be used as output members, and a planetary carrier for supporting a first planetary gear which engages the first sun gear and a second planetary gear which engages the second sun gear and the first planetary gear in such a manner that the first and second planetary gears rotate on their axes and revolve may be used as an input member.

The present invention may provide a device which is formed, as described in Japanese Laid-Open Patent Publication No. 2006-46642, of a pair of side gears (corresponding to the "pair of gears" in the present invention), pinion gears having a rotational axis perpendicular to the rotational axis of the side gears (corresponding to the "planetary gears" in the present invention), and a differential case for supporting the pinion gears through holding surfaces which slide against the outer peripheral surface of the pinion gears so that the pinion gears can rotate on their axes and revolve (corresponding to the "planetary carrier" in the present invention), where the differential case is used as an input member and the pair of side gears are used as output members.

The invention claimed is:

1. A limited slip differential, comprising:
a plurality of planetary gears;
a planetary carrier for supporting the planetary gears in such a manner that the planetary gears can rotate on their axes and revolve while making contact with and sliding against a surface of teeth of the planetary gears; and
a sun gear and a ring gear which are arranged coaxially with the planetary carrier and are allowed to differentially rotate by means of the planetary gears, wherein the limited slip differential limits differential motion generated between the sun gear and the ring gear,
wherein irregular unevenness is created on at least either of the surface of the teeth of the planetary gears, and the sliding surface of the planetary carrier which makes contact with and slides against the surface of the teeth, and
wherein the surface where the irregular unevenness is created has such a surface roughness that the maximum value of the power of a pitch of 40 μm to 60 μm, as found through Fourier analysis, is 0.4 μm to 1.2 μm.

2. The limited slip differential according to claim 1, wherein the surface where the irregular unevenness is created has a ten point average roughness of 5 μm to 12 μm.

3. The limited slip differential according to claim 1, wherein the irregular unevenness includes a plurality of first microscopic grooves which function as lubricant grooves and a plurality of second microscopic grooves which are shallower than the first microscopic grooves.

* * * * *